(12) United States Patent
Biederman et al.

(10) Patent No.: US 7,313,686 B2
(45) Date of Patent: Dec. 25, 2007

(54) METHOD AND APPARATUS OF INTEGRATING LINK LAYER SECURITY INTO A PHYSICAL LAYER TRANSCEIVER

(75) Inventors: Daniel C. Biederman, San Jose, CA (US); Li-Jau Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 841 days.

(21) Appl. No.: 10/676,390

(22) Filed: Sep. 30, 2003

(65) Prior Publication Data

US 2005/0071629 A1 Mar. 31, 2005

(51) Int. Cl.
*H04L 9/12* (2006.01)
(52) U.S. Cl. .................................... 713/151
(58) Field of Classification Search ................ 713/151
See application file for complete search history.

(56) References Cited

U.S. PATENT DOCUMENTS

| | | | |
|---|---|---|---|
| 5,689,568 A * | 11/1997 | Laborde | 713/151 |
| 6,222,852 B1 | 4/2001 | Gandy | 370/463 |
| 6,973,566 B2 * | 12/2005 | Smith et al. | 713/151 |
| 2002/0080771 A1 | 6/2002 | Krumel | 370/352 |
| 2003/0126428 A1 * | 7/2003 | Liu et al. | 713/151 |
| 2003/0206564 A1 | 11/2003 | Mills et al. | 370/528 |
| 2004/0030805 A1 | 2/2004 | Fujimori et al. | 709/250 |
| 2004/0076181 A1 * | 4/2004 | Pantelias et al. | 370/468 |
| 2005/0084076 A1 * | 4/2005 | Dhir et al. | 379/55.1 |

* cited by examiner

*Primary Examiner*—Matthew B Smithers
(74) *Attorney, Agent, or Firm*—Sierra Patent Group, Ltd.

(57) ABSTRACT

An apparatus for providing link layer security in a Physical Layer Transceiver (PHY) is disclosed. In one embodiment, the apparatus may comprise analog circuitry configured to interface with a data transmission medium, digital circuitry configured to interface with a Media Access Controller (MAC); and an crypto engine coupled to the digital circuitry.

15 Claims, 5 Drawing Sheets

METHOD AND APPARATUS OF INTEGRATING LINK LAYER SECURITY INTO A PHYSICAL LAYER TRANSCEIVER

BACKGROUND

1. Field of the Disclosure

The disclosure relates generally to link layer data communications.

2. The Prior Art

BACKGROUND

Physical Layer Transceivers ("PHY" or "PHYs") are known in the art for transmitting and receiving data through various media, such as copper and fiber optic cables.

In a receive mode, the PHY functions as a device that receives data from the medium and decodes the data into a form appropriate for the receiving device. In a transmit mode, the PHY takes data from the device, typically from the Media Access Controller ("MAC"), and converts the data into a form appropriate for the medium in use.

FIG. 1 is a functional block diagram of a typical prior art PHY 100. The PHY 100 is typically configured to interface between the MAC 110 of the host device and the medium 120.

The PHY 100 typically includes analog circuitry 130 configured for receiving data from the medium 120 and decoding the data into a form appropriate for the host device using techniques known in the art. The PHY 100 further includes digital circuitry 140 configured for receiving data from the MAC 110 and converting the data into a form appropriate for the medium 120.

The PHY 100 further includes memory and control circuitry 150 configured to control the operation of the PHY, and in particular the digital circuitry 140. The memory and control circuitry 150 will typically include circuitry to interface with the MAC 110 through a bus interface 160. Nonlimiting examples include the Medium Independent Interface ("MII"), Gigabit Medium Independent Interface ("GMII"), Ten Gigabit Medium Independent Interface ("XGMII" or "XAUI"), Reduced Gigabit Media Independent Interface (RGMII), and Serial Gigabit Media Independent Interface (SGMII).

BRIEF DESCRIPTION OF THE DRAWING FIGURES

DETAILED DESCRIPTION

Figure 1:
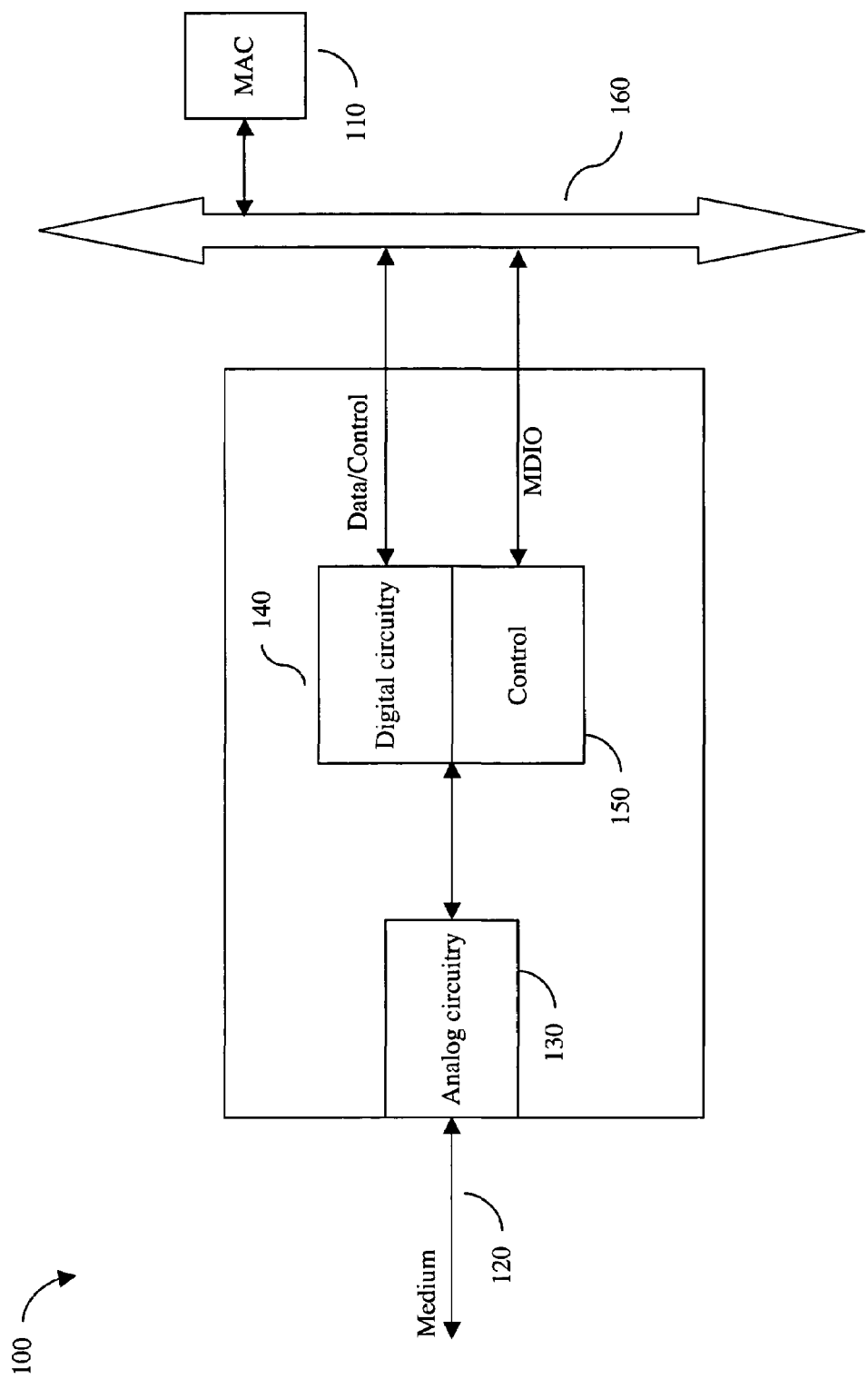
FIG. 1 is a conceptual block diagram of a prior art PHY.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

This disclosure provides security at the link layer of a system. In this regard, the link layer may be defined in accordance with the OSI reference devices residing between the MAC and medium, and is so defined herein.

In this disclosure, link layer security is provided in a transmission mode by encrypting data for confidentiality, authenticating data for integrity, or both as it is received from the MAC and prior being transmitted from the PHY. Conversely, in a receive mode, data is decrypted, authenticated, or both as it is received by the PHY, prior to presentation to the MAC.

Figure 2:
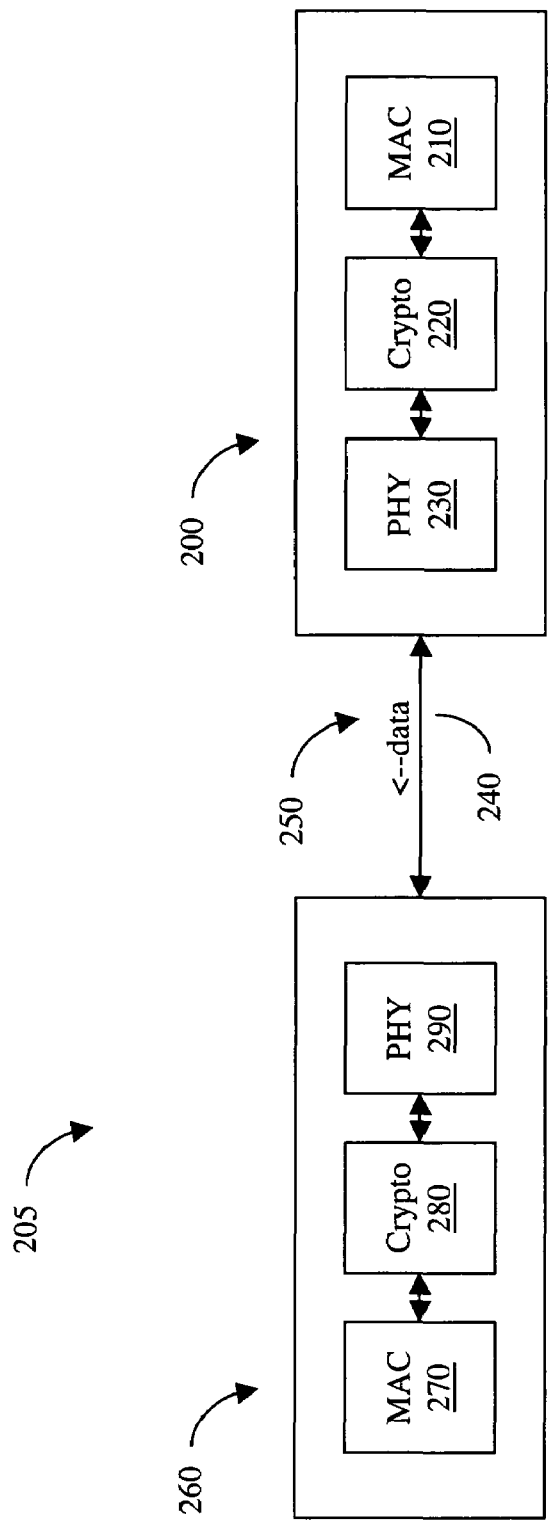
FIG. 2 is a conceptual block diagram of a data transmission system.

FIG. 2 is a diagram of a link layer data transmission system 205 configured in accordance with the teachings of this disclosure. The system 205 includes a transmitting device 200 coupled to a receiving device 260 through a medium 240.

The transmitting device 200 includes an ASIC configured to function as a MAC using techniques known in the art, and a PHY 230, such as that described in FIG. 1.

Coupled between the MAC 210 and the PHY 230 is a crypto device 220. The crypto device 220 is preferably configured to encrypt/authenticate the data packet 250 using DES, 3DES, MD5, SHA1, RC4, or AES, or other similar protocols.

In this example, the data packet is received by the crypto device 220 from the MAC 210, and encrypted/authenticated prior to being provided to the PHY 230 and transmitted onto medium 240.

The system 205 also includes a receiving device 260 that is configured similar to the transmitting device 200, including a MAC 270, a crypto device 280, and a PHY 290.

In the receiving device, the ciphered data packet 250 is received by the PHY 290 and provided to the crypto engine 280, where the data is decrypted/authenticated and provided to the MAC 270.

Of course, the operation disclosed in FIG. 2 may operate in the reverse path.

Figure 3:
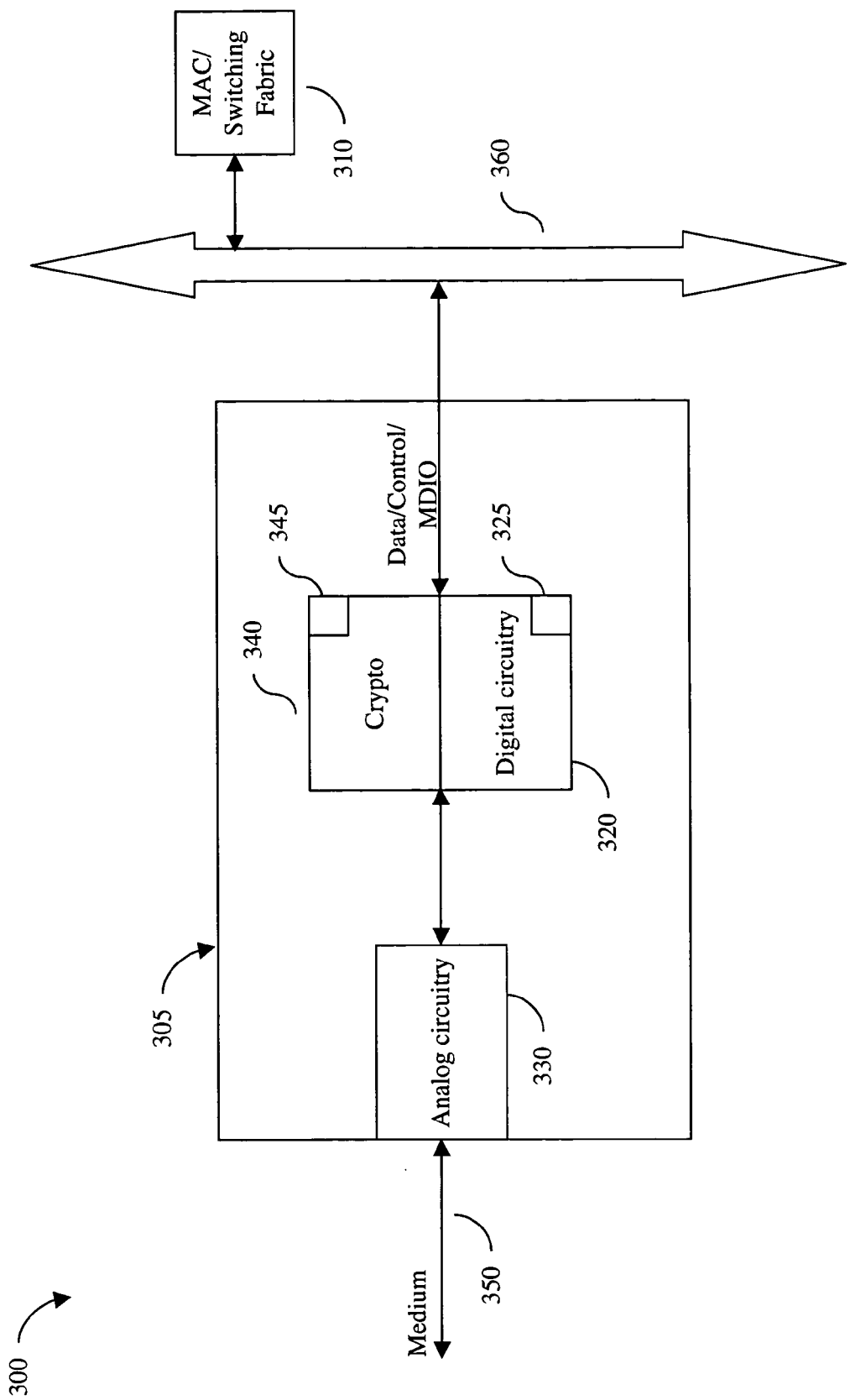
FIG. 3 is a conceptual block diagram of a PHY.

FIG. 3 is a conceptual block diagram of a further embodiment of a PHY configured in accordance with the teachings of this disclosure.

The embodiment of FIG. 3 provides that the crypto device is deployed on the same chip as the PHY, providing a single-chip link layer security solution.

The device 300 includes a MAC 310 and a PHY 305. The PHY 305 includes analog circuitry 330 configured in a receive mode for receiving data from the medium 350 and decoding the data into a form appropriate for the host device using techniques known in the art. In a transmit mode, the analog circuitry is configured to receive data from the MAC 310, and convert it into a form appropriate for the medium 350.

The PHY 305 further includes digital circuitry 320 configured for receiving data from the MAC 310 and converting the data into a form appropriate for the medium 350 in a transmit mode, and for receiving data from the analog circuitry 330 and converting it into a format appropriate for the MAC 310 in a receive mode.

The PHY 305 further includes memory and control circuitry 325 configured to control the operation of the PHY, and in particular the digital circuitry 320. The memory and control circuitry 325 will typically include circuitry to interface with the MAC 310 through a bus interface 360, such as a MII or a GMII or XGMII or XAUI or SGMII or RGMII.

The PHY 305 also includes a crypto module 340 coupled to the digital circuitry 320. The crypto module may include control and memory circuitry 345 for operation of the cryptographic functions. The crypto module 340 is preferably configured to encrypt/authenticate data received from the MAC 310 prior to presentation to the analog circuitry 330, and decrypt/authenticate data received from the analog circuitry 330 prior to presentation to the MAC 310. The crypto module may employ the cryptographic techniques disclosed above.

In a further embodiment, the crypto device 340 may be deployed using existing hardware already present in the PHY. It will be appreciated that by reusing existing hardware already present on the PHY to enable crypto features, significant real estate savings in the device may result.

It is contemplated that a wide array of PHY components may be reused when implementing the disclosed cryptographic features. For example, the crypto device may reuse the PHY's pin or interface layout, memory map, various elements of the state machine, logic gates, or even one or more of the above. Likewise, devices exist that contain multiple PHYs, such as an Octal PHY that contain 8 PHY interfaces. In these devices the reuse of pins and other elements that already exist in the PHY can reduce die and package size, thus making the devices less expensive to manufacture.

Similarly some chips incorporate the MAC as a portion of the PHY chip. In this case it may be possible to take advantage of elements from both the MAC and the PHY.

It is also contemplated that the additional functionality provided by the crypto device may be utilized for other functions or features. For example, the crypto device may be configured to perform data compression.

For example, in one embodiment, the device 300 of FIG. 3 may comprise a router in which the MAC 310 comprises an ASIC configured to also function as a switching fabric. In this case, there many be many PHYs present in the device, and by cross-utilizing the pre-existing structure of the PRY, additional security features may be added without additional chips.

In a further disclosed embodiment, the crypto device may be employed to improve the overall performance and reliability of a data transmission system.

As is appreciated by those of ordinary skill in the art, many such devices operate using a half duplex mode, where a common performance issue is the collision of data packets. It is contemplated that the additional functionality provided by the encryption device may improve collision management.

In this embodiment, the encryption memory 345 may be employed to temporarily store the data and associated security information as the packet is transmitted. If a collision is detected, the stored information may be immediately reused and resent, without the need for the processor or MAC to resend the data, or to send new security information such as a security association.

As will be appreciated by those having the benefit of this disclosure, this benefit may save processor cycle time, and may also improve performance by offloading some processing time from ASIC to the PHY.

It is contemplated that the crypto device may take advantage of certain areas of memory on the PHY. If the PHY complies with certain industry standards, such as I.E.E.E. 802.3, PHYs are provided with certain registers of memory that are reserved for specific purposes, known as the MII Management Interface. For example, registers 11-14 are reserved, and registers 16-31 are vendor-specific areas.

It is contemplated that security association database (SAD) used in the present disclosure may be directed to be written to certain areas in a predetermined order. For example, one bit in register 11 could be used to turn the crypto function on or off. Likewise, the crypto may need data, such as a key or security association, to perform a crypto function. This data could be accessed through register 12. This takes advantage of memory management techniques and structure already present. Of course, other registers may be used.

Another benefit of this disclosure may be realized as reduced traffic, as the PHY could be programmed to drop or "trash" received traffic that does not pass the decryption module. In this example, data that does not properly decrypt is flagged to be dropped by a subsequent module prior to being switched by the switching fabric, saving bandwidth in the switching fabric for other important functions. This could reduce the risk of an unauthorized user from bringing down a network or networked device due to denial of service attacks, thereby enhancing the reliability of the network. Alternatively, the security logic may interrupt the processor for further action.

Figure 4:
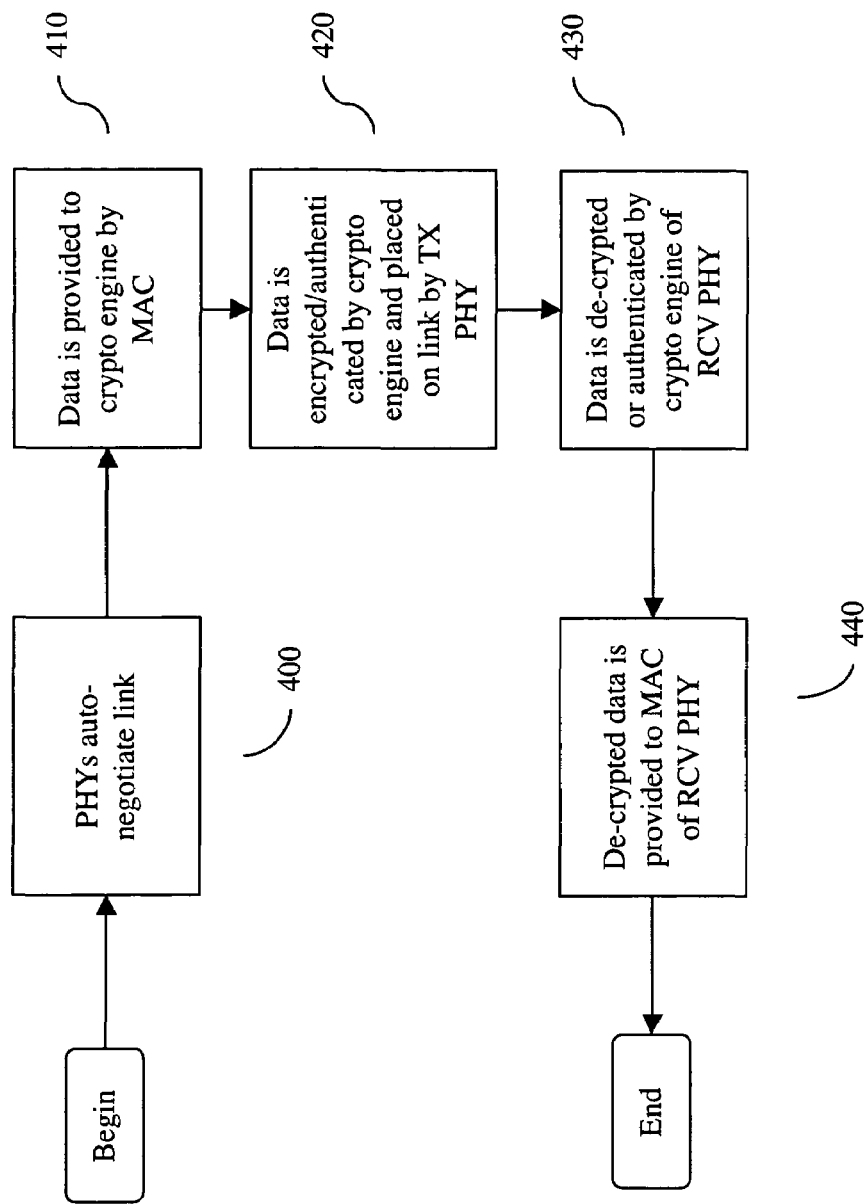
FIG. 4 is a flowchart of a method for providing link layer security.

FIG. 4 is a flowchart of a method of encrypting/authenticating data at the link layer of a data transmission system. In act 400, the PHYs wishing to communicate may auto-negotiate a link using techniques known in the art. It is to be understood that the encryption/authentication techniques disclosed herein may also be applied prior to auto-negotiation of a link.

In act 410, the MAC of the transmitting PHY ("TX PHY") provides the data to be transmitted to the crypto engine. In act 420, the data is ciphered by the crypto engine and placed on the medium linking the PHYs by the TX PHY.

In act 430, the receiving PHY ("RCV PHY") receives the cipher data from the link and presents the data to the RCV PHY's crypto engine, where the data is decrypted, authenticated, or both.

In act 440, the plain data is then passed to the MAC of the RCV PHY.

Figure 5:
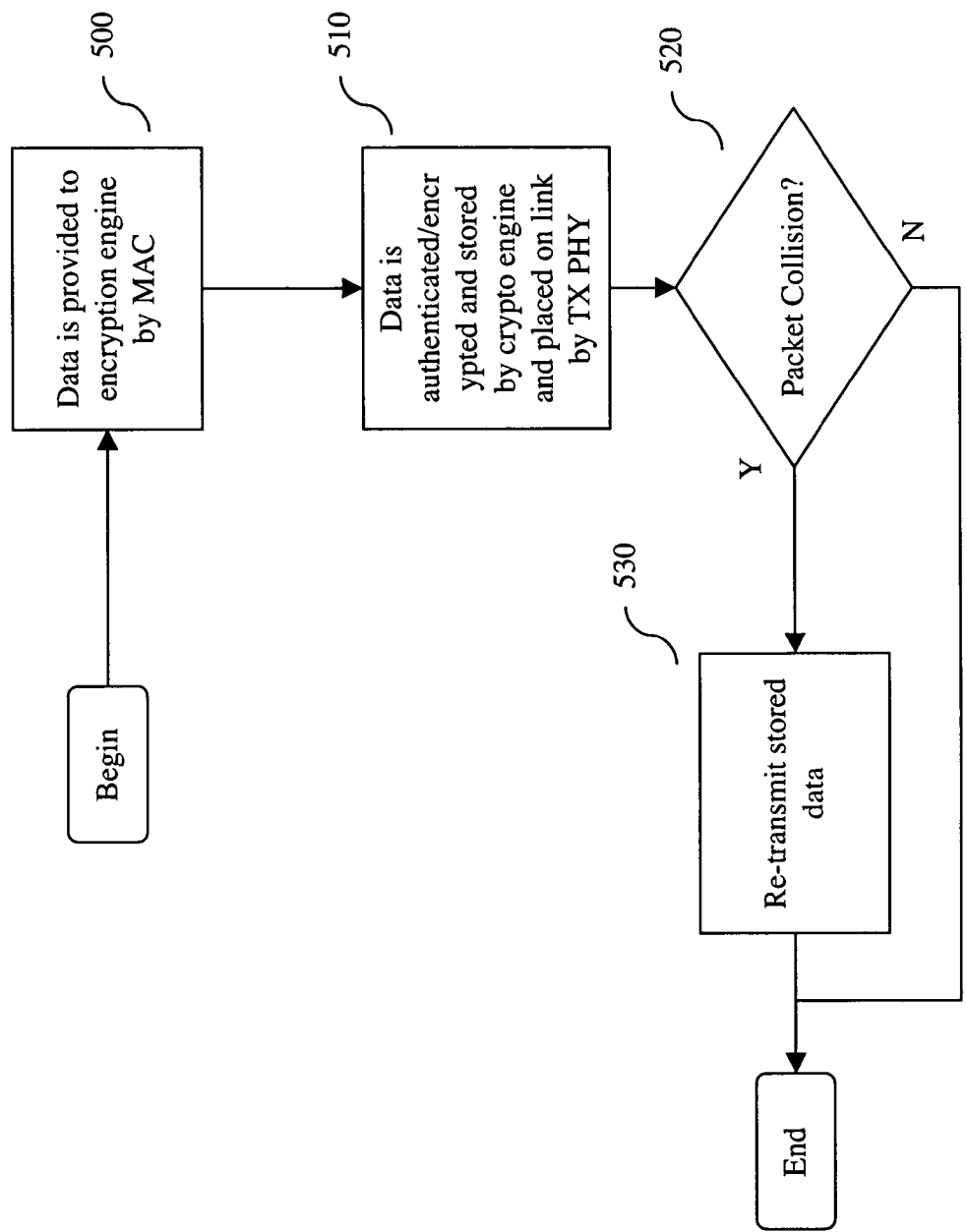
FIG. 5 is a flowchart of a method for managing packet collisions using a crypto engine.

FIG. 5 is a flowchart of a method for managing packet collisions using a crypto engine.

In act 500, the MAC of the TX PHY provides the data to be transmitted to the crypto engine. In act 520, the data is encrypted, authenticated or both by the crypto engine and placed on the medium linking the PHYs by the TX PHY. As mention above, the PHYs wishing to communicate may auto-negotiate a link using techniques known in the art, but the data may also be encrypted prior to auto-negotiation of a link. At this point, the encrypted/authenticated data is stored by the encryption engine.

In query 530, the PHY determines whether a packet collision has occurred. If a collision has occurred, the stored packet is re-transmitted by the TX PHY. If no collision occurs, the communication process proceeds as normal and any data stored could be flushed or used space reclaimed.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for providing link layer security in a Physical Layer Transceiver (PHY) comprising:
   analog circuitry configured to transmit to, and receive data from, a data transmission medium;
   digital circuitry coupled to said analog circuitry, said digital circuitry configured to transmit to, and receive from, a Media Access Controller (MAC); and
   a crypto engine coupled to said digital circuitry, wherein said crypto engine and said PHY are disposed on the same physical chip, wherein said crypto engine is further configured to perform a secondary function.

2. The apparatus of claim 1, wherein said crypto engine uses pre-existing hardware on said chip, said hardware pre-existing for the purpose of enabling the function of said PHY.

3. The apparatus of claim 2, wherein said pre-existing hardware is chosen from the group consisting of: said PHY's pin functionality, memory map, state machine, signals, signal buses and logic gates.

4. The apparatus of claim 1, wherein said apparatus is a component of a multi-PRY device.

5. The apparatus of claim 1, wherein said PHY communicates using a serial PHY media interface.

6. The apparatus of claim 1, wherein said secondary function comprises marking undesired data for dropping.

7. The apparatus of claim 1, wherein said MAC comprises an ASIC further configured as a switching fabric.

8. The apparatus of claim 7, wherein said apparatus is disposed within a router.

9. The apparatus of claim 8, wherein said crypto engine is further configured to manage data packet collisions.

10. A method of providing link layer security between a transmitting PHY and a receiving PHY, said method comprising:
    receiving, by the transmitting PHY, data from a first MAC;
    encrypting, by said transmitting PHY, said data, producing encrypted data;
    transmitting, by said transmitting PHY, said encrypted data to said receiving PHY;
    receiving, by said receiving PHY, said encrypted data;
    decrypting, by said receiving PHY, said encrypted data;
    providing the de-crypted data to a second MAC,
    storing, by said transmitting PHY, said encrypted data;
    determining whether a packet collision has occurred; and
    if a collision has occurred, then re-transmitting said stored encrypted data.

11. A program storage device readable by a machine, tangibly embodying a program of instructions executable by the machine to perform a method, the method comprising:
    receiving, by the transmitting PHY, data from a first MAC;
    encrypting, by said transmitting PHY, said data, producing encrypted data;
    transmitting, by said transmitting PHY, said encrypted data to said receiving PHY;
    receiving, by said receiving PHY, said encrypted data;
    decrypting, by said receiving PHY, said encrypted data;
    providing the de-crypted data to a second MAC,
    storing, by said transmitting PHY, said encrypted data;
    determining whether a packet collision has occurred; and
    if a collision has occurred, then re-transmitting said stored encrypted data.

12. An apparatus for providing link layer security in a Physical Layer Transceiver (PHY) comprising:
    means for receiving data from a first MAC;
    means for encrypting said data, producing encrypted data;
    means for transmitting said encrypted data to said receiving PHY;
    means for receiving said encrypted data;
    means for decrypting said encrypted data;
    means for providing the de-crypted data to a second MAC;
    means for storing said encrypted data;
    means for determining whether a packet collision has occurred; and
    means for re-transmitting said stored encrypted data.

13. The apparatus of claim 12, wherein said crypto engine means is further configured to perform a secondary function.

14. The apparatus of claim 13, wherein said secondary function comprises data compression.

15. The apparatus of claim 12, wherein said MAC further comprises switching fabric means.

* * * * *